Patented Nov. 18, 1924.

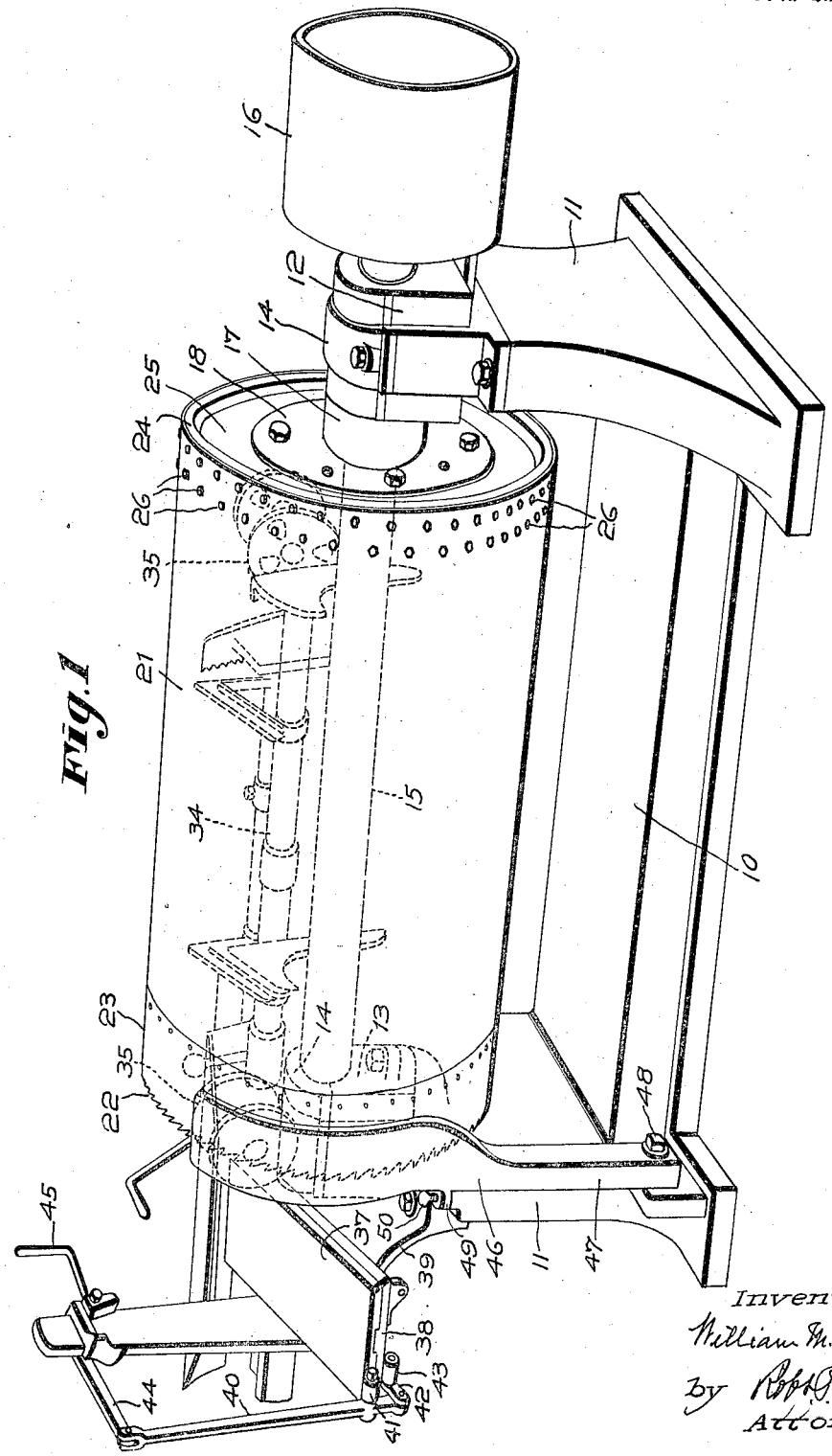

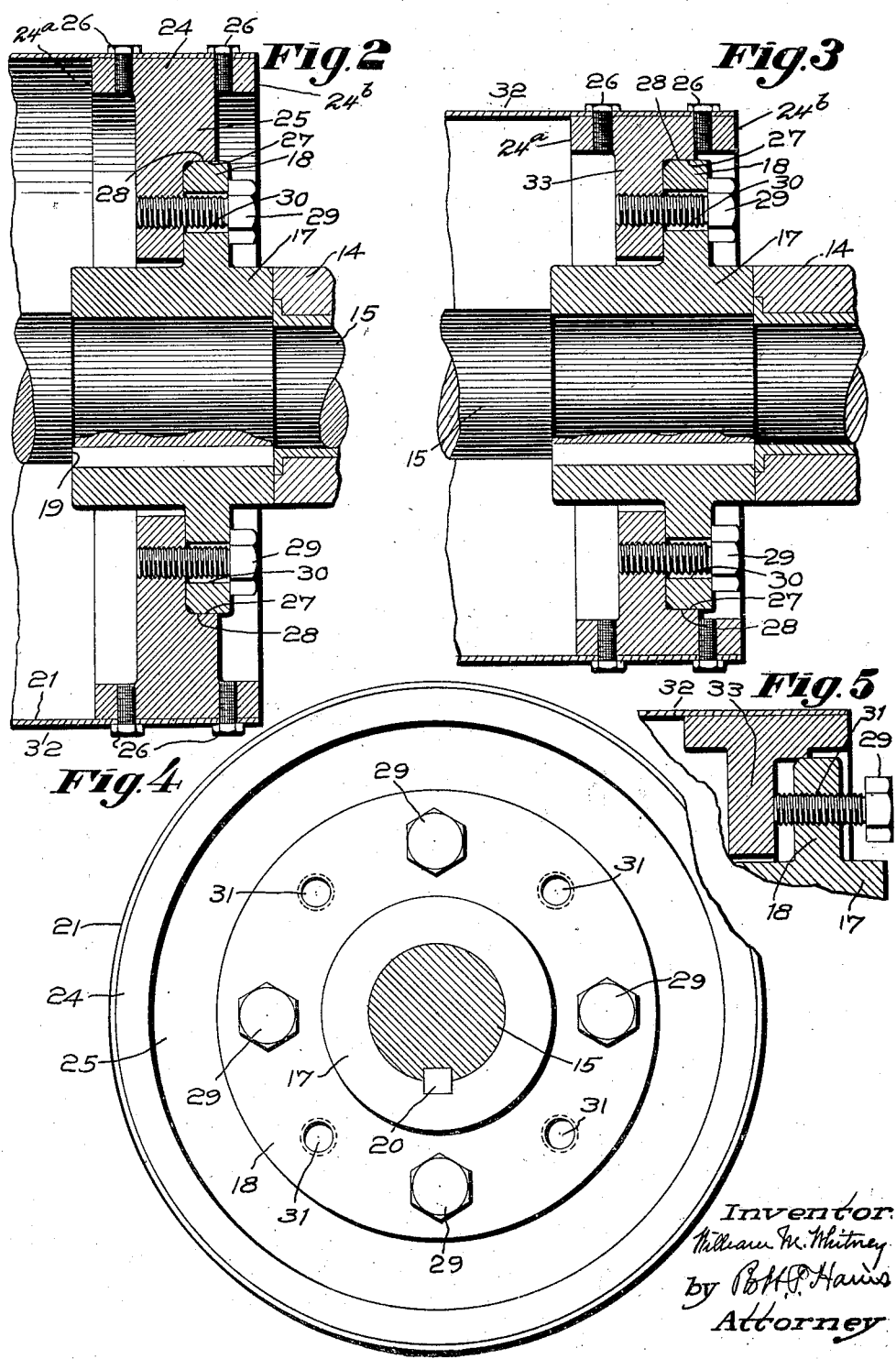

1,515,641

UNITED STATES PATENT OFFICE.

WILLIAM M. WHITNEY, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS.

DRUM-SAW MACHINE.

Application filed November 19, 1921. Serial No. 516,445.

*To all whom it may concern:*

Be it known that I, WILLIAM M. WHITNEY, a citizen of the United States, residing at Winchendon, in the county of Worcester and State of Massachusetts, have invented an Improvement in Drum-Saw Machines, of which the following description, in connection with the accompanying drawings, is a specification, like characters on the drawings representing like parts.

The invention to be hereinafter described relates to drum saw machines for forming barrel staves or other work.

The drum saw comprises a body having attached thereto an end portion of high-grade steel with cutting teeth thereon. The user of the machine grinds or sharpens these teeth from time to time, and eventually the end portion becomes worn away so that it is necessary to return the saw to the maker thereof in order that a new end portion may be substituted for the worn one. Heretofore, the construction has been such that the drum saw, its head and shaft, have been returned to the maker. These parts are of a heavy, bulky character, and expensive to ship to and from the maker. One of the purposes of the present invention, therefore, is to provide means readily detachable to connect the drum saw with the head on the shaft, in order that as small a part of the machine as possible will need to be shipped back to the maker.

To avoid substantial interruption in the use of the machine, it is desirable to ship a supply of saws to the user or to an agent so near to the user that a new saw may be delivered to the user promptly, when required. After a sufficient number of worn saws have accumulated, they may be sent by freight back to the maker to have their end portions renewed. Thus, the saws may be transported with a minimum expense.

In making barrel staves, different size saws are required to cut staves for different size barrels, and it may therefore be desirable to change the saw on a drum saw machine for one of a different size. Another purpose of the invention therefore is to provide simple and efficient means for securing any one of several different size saws to the shaft head of a stave sawing machine.

It is important that the drum saw be accurately centered upon the shaft so that it will run true. Another purpose of the invention, therefore, is to provide the drum saw with a head having a centering surface that fits a co-operating centering surface upon the shaft head, and to provide convenient means for securing the heads together and for forcing them apart when the drum is to be removed from the shaft.

The above and other purposes of the invention and novel combinations of parts will be herein described in connection with the accompanying drawings which show one good, practical form of the invention.

In the drawings:—

Figure 1 is a perspective view of a drum saw machine embodying the invention;

Fig. 2 is an enlarged longitudinal sectional view of the rear portion of the drum saw;

Fig. 3 is a view similar to Fig. 2, but shows a smaller drum saw;

Fig. 4 is a sectional view through the shaft, looking toward the rear end of the drum saw of Fig. 2; and Fig. 5 is a fragmentary sectional view of parts shown in Fig. 3.

Referring to the drawing: The machine may be provided with an appropriate frame consisting of a base 10 having upright end portions 11, and mounted upon the end portions 11 are bearings 12 and 13 provided with caps 14 detachably secured by bolts so that the caps may be removed to permit the drum saw shaft to be lifted from the bearings as more fully hereinafter described.

Journaled in the bearings 12 and 13 is a horizontal shaft 15 having a pulley 16 fast on one end thereof, and adapted to be driven by a belt from any suitable source of power.

Mounted on the shaft 15 is a head comprising a hub 17 having an outwardly-extending flange 18. The hub may be mounted on a reduced portion of the shaft, and confined against axial movement in respect to the shaft between the bearing 14 and a shoulder 19 on the shaft, and the hub preferably is secured to the shaft by a key 20.

A drum saw 21 may be provided of appropriate construction, preferably made of steel, and of sufficient thickness to give it the necessary stiffness and rigidity. This saw has teeth 22 at one end and a supporting head at its opposite end, and the distance between the head and teeth should be at least equal to the length of the stave to be formed. The teeth 22 may be formed in a portion 23 of the drum saw that is of a higher grade of steel than the remaining portion of the saw.

The drum saw head preferably is in the form of a ring 24 (see Fig. 2) that snugly fits within one end of the drum saw. The ring has an annular flange or web 25 extending radially inwardly toward the supporting shaft, and the ring has an annular flange 24ᵃ extending laterally from one side of the flange or web and an annular flange 24ᵇ extending laterally from the opposite side of the flange or web 25. The flanges 24ᵃ and 24ᵇ form a relatively wide bearing surface that is embraced by the drum saw, and to insure a tight fit between the drum saw and drum saw head, the former preferably is heated and shrunk on the latter. Bolts 26 may then be inserted through the drum saw into the flanges 24ᵃ and 24ᵇ, and by providing these flanges upon each side of the flange or web 25 the operating stresses are distributed upon opposite sides of the central web 25.

It is desirable to provide cooperating centering surfaces on the saw head and shaft head, and to this end, in the present instance, the flange 25 of the saw head is recessed to receive the flange 18 of the shaft head, and the annular wall 27 of said recess is formed accurately to fit the periphery 28 of the flange 18. The cooperating surfaces 27 and 28 preferably are ground to size to thereby increase the accuracy with which one head is centered upon the other.

Satisfactory means for detachably securing the heads together, in the present instance, consists of threaded bolts 29 which pass loosely through apertures 30 in the flange 18 and have threaded engagement with the flange 25, the arrangement being such that the flanges 18 and 25 may be firmly engaged by tightening the bolts 29 as will be apparent from the drawings. Clearance between the body portion of the bolts 29 and the apertures 30 is desirable because, in applying a saw to a shaft it is necessary to rotate one head relative to the other until the bolt holes in one are opposite the holes in the other, but if the bolts pass loosely through the apertures 30 the holes do not have to be aligned accurately.

In removing a drum saw from the shaft, the heads may stick together after the bolts 29 are removed, and it is therefore desirable to provide means for forcing the heads apart. To this end, in the present instance, the flange 18 is provided with threaded apertures 31 adapted to receive the bolts 29, the arrangement being such that the bolts may be screwed through the flange 18 so that they will abut against the flange 25 and force the heads apart as will be apparent from Fig. 5. To accommodate this use of the bolts, the threads preferably extend to within close proximity of the bolt heads, so that the bolts have the general appearance of tap bolts. The bolts 29 preferably are not long enough to protrude beyond the inner face of the flange 25, because any projections upon the inner face of the flange tends to cause sawdust to adhere to this face, which is undesirable.

In breasting-off or grinding the saw teeth, which is done by supporting a piece of emery in position to engage the teeth while the saw is rotated, it is desirable to hold the saw drum in its forward position while it rotates. That is, the shaft 15 usually has a small amount of play lengthwise, and it is desirable to prevent this play while the saw is being breasted-off. This may be done by holding a bar against the rear end of the saw drum to produce a forward pressure against the drum. In view of this practice, it is desirable that the rear face of the drum present a smooth surface to the bar held against the same, and to this end, the outer flange 24ᵇ of the saw head is constructed to extend rearwardly far enough to protect the heads of the bolts 29 and prevent contact therewith during rotation of the drum.

As stated, it may sometimes be desirable to change the size of drum used on a particular machine without changing the driving shaft 15. This may be readily done in accordance with the present invention by constructing the drum heads of different size drums so that they will fit the same shaft head. Satisfactory constructions for accomplishing this are shown in Figs. 2 and 3, wherein the size and construction of the shaft head is the same in both figures, but the drum saw 32 and the head 33 of Fig. 3 are smaller than in Fig. 2. The head 33 has a recess adapted to snugly receive the flange 18 the same as in Fig. 2, and the heads shown in Fig. 3 may be secured together the same as in Fig. 2.

The blocks or stave bolts to be cut by the saw may, in the production of barrel staves or other work, be carried by a carriage 34 having wheels 35 adapted to roll along tracks mounted on the supporting frame, and the carriage may be moved back and forth by a suitable handle.

To contribute to proper position of the work as it is acted on by the saw, a gage 37 may be provided adapted to slide along a table 38 carried by brackets 39 mounted on one of the frame uprights. The gage 37 may be adjusted by means of a lever 40 pivotally connected to a boss 41 on the gage. The lower end of this lever is connected by a link 42 to a fulcrum 43 mounted at one end of the table 38. The upper end of the lever 40 is connected by a link 44 with a control device including a handle 45. Since the carriage and the gage are of usual construction, it is unnecessary to show and describe the same in detail herein. To protect the workman from the saw teeth, a guard 46 may be provided, curved to conform to the contour of the drum saw. This guard may have an arm 47 fulcrumed on a bolt 48 secured to one of the uprights, said arm being provided with a lug 49 adjustably secured to a shoulder on one of the uprights by a screw 50.

When the end portion of the drum saw has been worn away and it is necessary to return the same to the maker so that a new end portion may be substituted therefor, the saw may be quickly and easily detached from the shaft head by removing the bolts 29. This will allow the drum 21 to be moved axially of the shaft until the heads are disengaged. The bearing caps 14 may be released, and then the shaft may be lifted from its bearings so as to allow the removal of the drum saw and its head therefrom. Then a new saw or one having a renewed end portion may be substituted for the saw thus removed. To accomplish this, the new saw is inserted over the shaft and given a proper rotative adjustment so as to bring the bolt holes in the flanges 18 and 25 into registry. Then the bolts 29 may be inserted and screwed up to secure the heads together and as the heads are brought together the saw will be centered on the shaft by the cooperating centering surfaces 27, 28.

What is claimed is:

1. In a stave-sawing machine, the combination of a frame having spaced bearings, a horizontally extending shaft journaled in said bearings, a head having a hub fast on said shaft and having an outwardly-extending flange, a drum stave saw having saw teeth at one end thereof, a drum saw head having a radially extending annular flange provided with an annular recess having a centering surface to engage the said outwardly extending flange of the hub to center the one head upon the other, and bolts for removably clamping the outwardly extending flange of the hub within the recess of the flange of the drum saw head.

2. In a stave-sawing machine, the combination of a frame having spaced bearings, a horizontally extending shaft journaled in said bearings, a head having a hub fast on said shaft and having an outwardly extending flange, a drum stave saw having saw teeth at one end thereof, a drum saw head secured within the other end of said saw and having an annular wall adapted to embrace the periphery of said outwardly extending flange to center one head upon the other and a web extending radially inward beyond said annular wall, and threaded tap-bolts for clamping said heads together.

3. In a stave-sawing machine, the combination of a saw operating shaft, a hub secured to the shaft and having an outwardly extending flange, a drum stave saw having teeth at one end thereof, a drum saw head secured in the other end of the saw and having an annular flange extending inwardly which flange is provided with an annular centering surface to embrace the outwardly extending flange of the hub and center the drum saw upon the operating shaft, said flanges being constructed so that a radially extending portion of one overlaps a radially extending portion of the other and are provided with bolt-receiving apertures, and bolts insertable in one set of apertures to clamp the flanges together and insertable in another set of apertures to force the flanges apart.

4. In a stave sawing machine, the combination of a saw operating shaft, and means for removably securing different sized drum stave saws to the shaft comprising, a hub secured to the shaft and having an outwardly extending flange, a drum saw head secured in the rear end of a drum stave saw and having an annular flange extending inwardly to overlap the outwardly extending flange of the hub and provided with an annular centering surface constructed to embrace the outer annular edge of the portion of the hub flange that overlaps the head flange, and means for clamping the overlapping portions of the flanges together.

In testimony whereof, I have signed my name to this specification.

WILLIAM M. WHITNEY.